United States Patent Office 3,349,116
Patented Oct. 24, 1967

3,349,116
ORTHO HYDROCARBYLOXY ALKENYLENE-
PHENYL N-LOWER ALKYLCARBAMATES
Edward D. Weil, Lewiston, and Hans L. Schlichting, Grand Island, N.Y., assignors to Hooker Chemical Corporation, Niagara Falls, N.Y., a corporation of New York
No Drawing. Filed Feb. 20, 1963, Ser. No. 260,077
8 Claims. (Cl. 260—479)

This invention relates to new compositions of matter and to processes for utilizing them. More particularly, this invention is concerned with novel substituted aryl N-alkylcarbamates and to processes for controlling pests by employing these compositions.

The carbamate compositions of the present invention find utility as pesticides, especially as insecticides, miticides, and nematocides. The compositions possess a broad spectrum of activity against insects such as flying insects, sucking insects, biting insects, and chewing insects, as well as other invertebrate pests.

The composition of the present invention also possess useful selectivity when utilized as pesticides. For example, the compositions of the invention are capable of controlling insect pests without destroying certain beneficial insects such as lepidopterous insect predators. Also, compositions of the present invention exhibit systemic properties not possessed by related compounds.

The novel compositions of the invention can be represented by the following general formula:

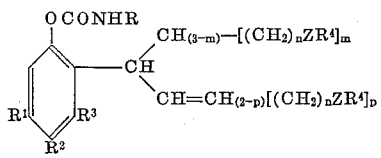

wherein the substituent R is an alkyl group having from 1 to 6 carbon atoms, preferably one, wherein the substituents $R^1$, $R^2$, and $R^3$ are each individually selected from the group consisting of hydrogen, halogen (chlorine, bromine, fluorine, iodine), lower alkyl (from 1 to about 6 carbon atoms), lower alkoxy, and di(lower alkyl) amino, wherein $R^4$ is a substituent selected from the group consisting of lower alkyl of from 1 to 6 carbon atoms), allyl, cyclohexyl, phenyl, benzyl, and lower acyl (1 to 6 carbon atoms), Z is a substituent selected from the group consisting of oxygen, sulfur, —S(=O)— and —SO$_2$—, Z being selected from oxygen and sulfur when $R^4$ is acyl, $m$ is an integer from 0 to 1 inclusive, $p$ is an integer from 0 to 1 inclusive, the sum of $m$ and $p$ always being equal to one and $n$ is an integer from 0 to 1 inclusive.

Illustrative examples of lower alkyl substituents include methyl, ethyl, propyl, butyl, isobutyl, secondary-butyl, tertiary-butyl, n-amyl, secondary-amyl, hexyl and the like. Examples of the lower alkoxy substituents include methoxy, ethoxy, isopropoxy, secondary-butoxy, n-butoxy, isobutoxy, tert-butoxy, n-amyloxy, isoamyloxy, secondary-amyloxy, tert-amyloxy, and hexyloxy. By halogen is meant bromine and chlorine preferably, although fluorine and iodine are workable. Examples of lower acyl include formyl, acetyl, propionyl, butyryl, isobutyryl, acrylyl, methacrylyl, chloroacetyl, isovaleryl, valeryl, and hexanoyl.

The preferred embodiments because of their lower cost and higher pesticidal activity are those wherein $R^4$ is lower alkyl and Z is oxygen or sulfur. Further, mixtures of said compounds are also within the scope of the present invention. Preferred mixtures because they are readily synthesized are those two-component mixtures in which the compositions differ in values of $m$ and $p$ only.

Illustrative examples of the compositions included in the instant invention wherein $R^4$ is lower alkyl, preferably methyl, ethyl, propyl, isopropyl, butyl, isobutyl, secondary-butyl, tert-butyl, amyl, hexyl, cyclohexyl or allyl, or less preferably, dodecyl, phenyl, chlorophenyl, and benzyl.

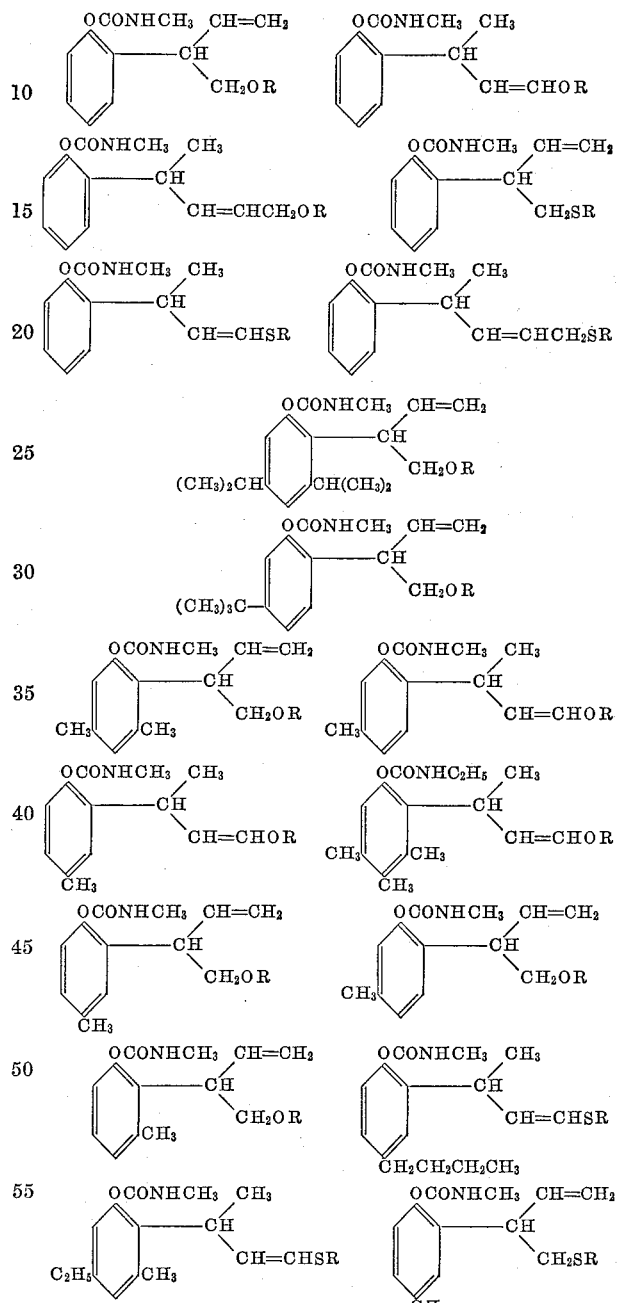

The invention encompasses, for example, o-allylphenyl N-methylcarbamates having the following substituent on the alpha position of the allyl group:

2-methoxyethyl
acetoxymethyl
butyloxymethyl
hexanoyloxymethyl
benzoyloxymethyl
acetylthiomethyl
methylsulfinylmethyl
methylsulfonylmethyl
2-methylthioethyl
2-ethylthioethyl
2-tert-butylthioethyl
methylthiomethyl
ethylthiomethyl
butylthiomethyl
2-acetylthioethyl
methoxymethyl Also encompassed, for example, are o-methallylphenyl N-methylcarbamates having the above listed substituents on the gamma position of the methallyl group. Illustrative examples of these compositions include the following 2-(1-[methoxymethyl]allyl-4-methylphenyl N-methylcarbamate
2-(1-[methoxymethyl]allyl-4-chlorophenyl N-methylcarbamate
2-(1-[methoxymethyl]allyl-4-bromophenyl N-methylcarbamate
2-(1-[methoxymethyl]allyl-4-iodophenyl N-methylcarbamate
2-(1-[methoxymethyl]allyl-4-fluorophenyl N-methylcarbamate
2-(1-[methoxymethyl]allyl-5-methylphenyl N-methylcarbamate
2-(1-[methoxymethyl]allyl-5-isopropylphenyl N-methylcarbamate
2-(1-[methoxymethyl]allyl-3,5-dimethylphenyl N-methylcarbamate
2-(1-[methoxymethyl]allyl-3-methyl-5-isopropylphenyl N-methylcarbamate
2-(1-[methoxymethyl]allyl-4,5-dimethylphenyl N-methylcarbamate
2-(1-[methoxymethyl]allyl-4-methyl-5-tert-butylphenyl N-methylcarbamate
2-(1-[methoxymethyl]allyl-5-methoxyphenyl N-methylcarbamate
2-(1-[methoxymethyl]allyl-3,5-dimethoxyphenyl N-methylcarbamate
2-(1-[methoxymethyl]allyl-4-(dimethylamino)phenyl N-methylcarbamate
2-(1-[methoxymethyl]allyl-4-(dimethylamino)-M-cresyl N-methylcarbamate
2-(1-[methoxymethyl]allyl-5-hexyloxyphenyl N-methylcarbamate
2-(1-[methoxymethyl]allyl-5-isopropoxyphenyl N-methylcarbamate
2-(1-[methoxymethyl]allyl-4-(dibutylamino)phenyl N-methylcarbamate
2-(1-[methoxymethyl]allylphenyl N-ethylcarbamate
2-(1-[methoxymethyl]allylphenyl N-butylcarbamate
and homologs having [2-methoxyethyl] instead of [methoxymethyl].

The new carbamates of the invention are prepared from the corresponding phenols, which are also new compositions of matter disclosed in copending application, Ser. No. 262,375 of even date.

The conversion of the phenol to the carbamate is accomplished by any of the known methods for converting phenols to N-methylcarbamates, such as (a) reaction of the phenol, preferably in the form of a salt, with phosgene to obtain the chloroformate, which is then reacted with methylamine, (b) reaction of the phenol, especially in the presence of one mole of base, with methyl carbamyl chloride, and (c) reaction of the phenol with methyl isocyanate. The synthesis of the new phenols of the invention is accomplished by heating and thus rearranging ethers of the type

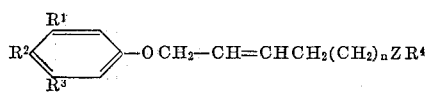

where the substituents R¹, R², R³, and R⁴ as well as Z and $n$ are as defined heretofore.

The ethers required as starting materials (most of which are new compositions of matter) may be made by reacting the appropriate phenols of the formula

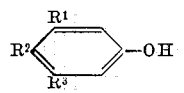

preferably in the presence of a base with an ether of the structure $XCH_2CH=CHCH_2(CH_2)_nZR^4$ where X is a nucleophilically replaceable negative substituent such as halide, sulfonate, or sulfate, most commonly chloride or bromide for economic reasons. It is also possible to react the phenol with an isomeric ether of the structure $$CH_2=CH-CHX(CH_2)_nZR^4$$

in which case the phenoxy group becomes attached to the terminal carbon atom with simultaneous shift of the double bond into a position beta-gamma to the phenoxy group to yield the same product which is obtained by use of the $XCH_2CH=CHCH_2(CH_2)_nZR^4$ isomer.

An alternative route to the ethers required as starting materials for the process of the invention is, first, to react a 4-halo-2-butenyl aryl ether of the structure

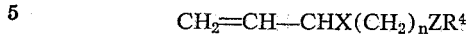

with at least one molar equivalent of a nucleophile $MZR^4$, where M is a cation such as a metal (such as sodium) ammonium, or alkylammonium cation, preferably in an ionizing solvent (such as alcohol, water, dioxane, dimethylformamide, or the like), until the halogen is replaced by $ZR^4$. This method is useful where the value of $n$ in the product formula is zero.

The conversion of the ethers described above to the phenols is conducted by heating the ether to a temperature in the range of about 125 to 275° C., preferably 140 to 260° C., by itself or in the presence of an inert solvent such as N,N-diethylaniline, until a substantial conversion of the ether to a phenol occurs. The course of the reaction is known from study of numerous simpler examples to proceed with rearrangement of the o-allyl radical onto the ring position ortho to the phenolic oxygen. A small usually trivial, amount of para substitution may accompany this principal reaction, and the products of the invention may contain minor amounts of isomeric impurities from this cause, such impurities being either separated or tolerated as harmless. The principal course of the rearrangement appears to be

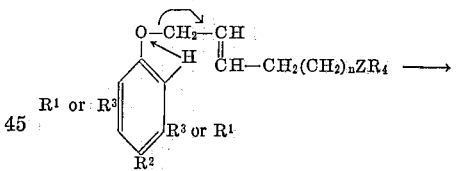

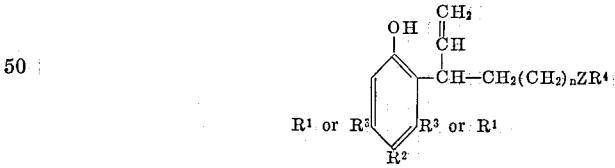

A further rearrangement proceeds concurrently and subsequently, to a larger degree when the temperature is in the high end of the indicated range or the time lengthened, to a slight degree when the temperature is held near the middle to lower end of the indicated range or as the reaction time is held to a minimum. This further rearrangement proceeds as follows

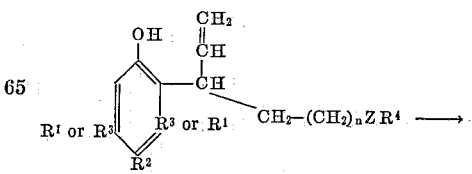

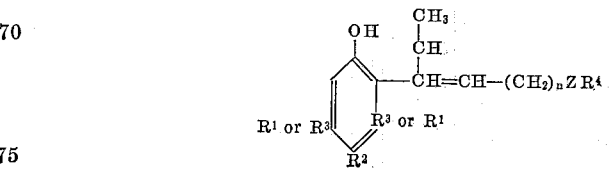

This second rearrangement is generally minor, and the products generally predominate in the isomers wherein $m=1$ and $p=0$.

The process may be operated conveniently at or near atmospheric pressure, although lower and higher pressures may be utilized without departing from the scope of the invention.

The infrared spectra of the phenol and carbamate products of the invention may exhibit bands indicative of both the —CH(CH=CH$_2$)—CH$_2$— and

—CH(CH$_3$)CH=CH— structures, usually mainly the first. The components can be resolved by fractionation, chromatography, or, in some cases, by recrystallization. However, for economic reasons it is preferred to leave the mixtures intact, both types of structures being active. It is also possible, as noted already, to make the product under conditions such that it is predominantly one isomer or the other.

The rearrangement reaction of the ethers described above can also be conducted with essentially sole formation of the phenolic products of the invention where $m$ is 1 and $p$ is 0 by subjecting the said ethers to a Lewis acid catalyst, such as boron halides, especially boron trichloride, at about —30° to 100°.

Where Z is to be —SO— or —SO$_2$—, the corresponding sulfide (Z=S) is oxidized with one or two molar equivalents, respectively, of a sulfide oxidizing reagent such as hydrogen peroxide, peracetic acid or other peroxy acid, ozone, nitrogen dioxide, or the like. The oxidation may be conducted at the ether stage, the phenol stage, or the carbamate stage, most conveniently at the latter stage.

The compositions of the invention may be employed as pesticides in the pure form or as liquid or solid formulations.

An advantage of the insectional compositions of the invention is that they may be readily formulated in various ways. For example, they may be used as reaction "crudes" or as purified products. They may be employed after admixing with conventional pest control adjuvants, diluents or conditioning agents, hereinafter referred to as inert carriers, to provide compositions in the form of solutions, emulsions, dispersions, powders dispersible in water or other solvents, dusts, or the like. For example, they may be formulated with a carrier or diluent substance such as finely divided solid (such as clay, talc, vermiculite, etc.), a solvent of organic or inorganic origin (such as petroleum hydrocarbons), water, a surface active agent or aqueous emulsion of any suitable combination of one or more of any of these. For household and barn use, formulations of the compounds of the invention with aerosol propellants such as the freons are convenient. Such formulations or compositions facilitate handling and application and frequently enhance insecticidal effectiveness.

Since the exact amount of insecticide in a given mixture will depend upon the type of use, species of insect, mode of formulation, mode of application, prevailing atmospheric conditions and other variables, it is not possible to state the application rate generally with any degree of preciseness. However, where the insecticide is made up to treat crops being attacked by in an insect pest, the general application rate of active insecticide will range from 0.03–10 pounds per acre with the upper rates above this figure limited by economics. In application to dwelling places and barns, a deposit of at least one milligram per square foot of surface is preferred. It may be said in passing that a diluent, conditioning agent and/or adjuvant material will usually make up the bulk of the insecticidal compositions with the active ingredient ordinarily being present on a percent weight basis of under ninety percent, but generally, above about 0.005 percent. Suitable formulations include solutions of the pesticide composition in a solvent such as petroleum hydrocarbons, i.e. xylene, heavy aromatic naphthalenes and the like. Aqueous dispersions or emulsions generally containing surface active agents such as those listed in "Soap and Chemical Specialties," volume 3, No. 7, pages 50–61, No. 8, pages 48–61, No. 9, pages 52–67, and No. 10, pages 38–67 (1955). Also useful are solid formulations of the composition of the instant invention. For example, solid carriers such as talc, silica, vermiculite, and the like may be utilized in the formulation. The solid formulation may also contain surface active agents, sticking agents, stabilizing agents, or binders to facilitate their application.

The insecticides of the invention are compatible with other insecticides and may be used in combination with any of the insecticides, for example, such as those listed by Kenaga in the Bulletin of the Entomological Society of America, vol. 6, No. 2, pp. 56–72 (1960), said insecticides acting to complement, supplement, accelerate, synergise, or otherwise enhance the activity of the insecticide of the invention. Such insecticides include, for example, DDT, DDD, methoxychlor, isobornyl thiocyanoacetate, lauryl thiocyanate, lethanes (substituted alkyl thiocyanates), malathion, ronel, pyrethrins, synthetic pyrethrin analogs, 0,0-dimethyl 2,2-dichlorovinyl phosphate, phosdrin, lindane, toxaphene, 1,1-bis(p-chlorophenyl)-2,2,2-trichloroethanol, p-chlorophenyl 2,4,5-trichlorophenyl sulfone, aryl alkyl sulfites, ethion, dimethoate, phorate, demeton, phosphamidon, quinoxaline trithiocarbonates, zineb, sulfur and bis(pentachlorocyclopentadienyl), and the like. The compounds of the invention, because of their fast action, are useful in combination with slow-acting ingestion insecticides such as the product of melting point one hundred and forty-eight degrees from hexachlorocyclopentadiene and chlorosulfonic acid as described in U.S. Patent 2,516,404 (1951).

The insecticides of the invention may also be synergised by insecticidal synergists such as the following examples:

Piperonyl butoxide
Sesoxane(2-(3,4-methylenedioxyphenoxy)-3,6,9-trioxaundecane)
Sulfoxide (n-octyl sulfoxide of isosafrole)
n-Propyl isomer
Sesamine oil extractives
Octachlorodipropyl ether Other synergists usable wtih the compound of the invention are those listed by Kenaga, loc. cit., p. 55–56.

In order that those skilled in the art may better understand the present invention and the manner in which it may be practiced the following specific examples are given.

EXAMPLE 1

A solution of 40 grams of trans-1,4-diphenoxy-2-butene and 200 cubic centimeters of N,N-diethylaniline was refluxed for 7 hours, then stripped under 0.4 millimeter pressure to remove diethylaniline. The residual oil was washed with dilute hydrochloric acid several times, then extracted with 200 cubic centimeters of 10 percent NaOH. The caustic solution was acidified, depositing an oil which was extracted with benzene, the benzene washed with water and dried over magnesium sulfate. The solution was then filtered and evaporated, leaving 30 grams of product as an oil.

Analysis.—Calculated for $C_{16}H_{16}O_2$: neutralization equivalent 240. Found: (potentiometric titration with tetrabutylammonium hydroxide in pyridine): 250.

The infrared spectrum of the product showed bands of about equal strength at wave lengths characteristic of terminal and nonterminal C=C groups; also both CH$_3$— and =CH$_2$ bands were in evidence. The product consequently is a mixture of I and II.

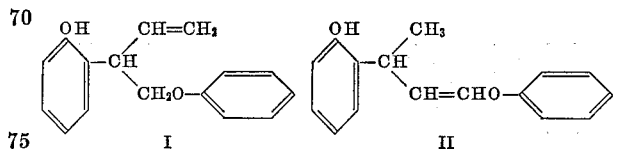

By conducting the reaction at 165 degrees centigrade, a phenolic product predominantly having the band characteristic of —CH=CH₂ groups is obtained.

EXAMPLE 2

Five grams of the product of Example 1, 1.5 grams of methyl isocyanate, 20 cubic centimeters of benzene, and 1 drop of dibutyltin laurate were mixed and let stand for one hour. The mixture was then evaporated leaving the carbamate as an oil. Potentiometric titration indicated the phenolic group to be absent.

*Analysis.*—Calculated for $C_{18}H_{19}O_3N$: N, 4.72. Found: N, 4.79.

On prolonged standing, the oil partly crystallized. The crystals were removed and recrystallized from benzene-heptane to obtain a colorless solid, melting point 66 to 67 degrees centigrade. Infrared analysis showed essentially none of the —CH=CH₂ band at 915 cm.⁻¹, consequently this crystalline product was substantially the pure isomer having the —CH(CH₃)CH=CHOC₆H₅ side chain.

EXAMPLE 3

To a solution of 10 grams of sodium methoxide in 100 cubic centimeters of methanol was added 18.3 grams of trans-1-chloro-4-phenoxy-2-butene, then the mixture was refluxed for several hours, stripped free of methanol under reduced pressure and the residue added to water. The organic oil was extracted with ether, dried over soda ash, and then stripped free of ether under reduced pressure leaving 15.5 grams of 1-methoxy-4-phenoxy-2-butene as a colorless oil.

A solution of 14 grams of 1-methoxy-4-phenoxy-2-butene in 50 cubic centimeters of diethylaniline was refluxed for 13 hours, then the product isolated as in Example 1 to obtain 8.5 grams of colorless phenolic oil. The infrared spectrum indicated it to be predominantly the o-substituted phenol having the

—CH(CH₂OCH₃)CH=CH₂ side chain.

EXAMPLE 4

Five grams of the product of Example 3, 2 grams methyl isocyanate, 1 drop dibutyltin laurate, and 50 cubic centimeters benzene were refluxed for one hour, then stripped to 100 degrees centigrade under aspirator vacuum, leaving the product as a colorless oil.

*Analysis.*—Calculated for $C_{13}H_{17}O_3N$: N, 5.96. Found: N, 5.7.

EXAMPLE 5

To a solution of 6 grams of sodium methoxide and 7 grams of ethyl mercaptan in 100 cubic centimeters of methanol was added 18.3 grams of 1-chloro-4-phenoxy-2-butene. After standing overnight, the solution was added to water, the oil extracted with ether, dried over magnesium sulfate, and evaporated free of ether leaving 1-ethylthio-4-phenoxy-2-butene as a colorless oil, boiling point 90 to 93 degrees centigrade (0.08 millimeter).

*Analysis.*—Calculated for $C_{12}H_{16}OS$: S, 15.4. Found: S, 15.0.

EXAMPLE 6

A solution of 14 grams of the product of Example 5 in 50 cubic centimeters of diethylaniline was refluxed for 10 hours, then worked up as in Example 1 to obtain 12 grams of phenolic oil, having the correct neutralization equivalent for $C_{12}H_{16}OS$.

EXAMPLE 7

The product of Example 6 (4 grams) was allowed to stand in 25 cubic centimeters of benzene with 1.5 grams of methyl isocyanate for 4 days, then the mixture was stripped to 100 degrees centigrade at 0.01 millimeter pressure leaving a brownish oil. A potentiometric titration demonstrated the absence of the phenolic group. The infrared spectrum indicated the carbamate carbonyl group (band at 5.7 microns).

EXAMPLE 8

To a solution of 6 grams of sodium methoxide and 12.5 grams of thiophenol in 100 cubic centimeters of methanol was added 18.3 grams of 1-phenoxy-4-chloro-2-butene. After standing overnight, the reaction mixture was poured into water. The product came out as colorless crystals which were washed with water, then recrystallized from aqueous ethanol to obtain 18.5 grams colorless platelets, melting point 50 to 51.5 degrees centigrade.

*Analysis.*—Calculated for $C_{16}H_{16}OS$: S, 12.5. Found: S, 12.0.

EXAMPLE 9

A solution of 14 grams of the product of Example 8 in 50 cubic centimeters of N,N-diethylaniline was refluxed under nitrogen for 10 hours, then worked up as in Example 1 to obtain a phenolic oil having the correct neutralization equivalent for $C_{16}H_{16}OS$.

EXAMPLE 10

The reaction of the product of Example 9 with methyl isocyanate was conducted as in Example 7 to obtain the desired carbamate as a brownish oil.

*Analysis.*—Calculated for $C_{18}H_{19}O_2SN$: N, 4.48. Found: N, 4.1.

EXAMPLES 11–16

Following the procedure of Example 3, 0.1 mole portions of trans-1-chloro-4-phenoxy-2-butene was reacted with substantially equimolar amounts of various sodium alkoxides in excess of the alcohols corresponding to the alkoxides. In each case, after at least 40 hours at room temperature (except for initial spontaneous exotherm) the reaction mixtures were stripped free of the alcohol, the residues washed with water, and the organic oil distilled. The yields and properties of the products are as follows:

| No. | Ether | Yield (g.) | Properties |
|---|---|---|---|
| 11E | 1-ethoxy-4-phenoxy-2-butene | 15 | Oil, B.P. 86–90° (0.05 mm.). |
| 12E | 1-isopropoxy-4-phenoxy-2-butene | 13 | Oil, B.P. 84–90° (0.15 mm.). |
| 13E | 1-n-butoxy-4-phenoxy-2-butene | 15 | Oil, B.P. 107–110° (0.25 mm.). |
| 14E | 1-pri-amyloxy-4-phenoxy-2-butene | 17.5 | Oil, B.P. 110–114° (0.1 mm.). |
| 15E | 1-cyclohexyloxy-4-phenoxy-2-butene. | 11 | Oil, B.P. 120.5–123° (0.15 mm.). |
| 16E | 1-(2-methoxyethoxy)-4-phenoxy-2-butene. | 15 | Oil, B.P. 107–111° (0.1 mm.). |

Each of these products was rearranged to the corresponding alkoxybutenyl phenol by heating without solvent under nitrogen in a vessel immersed in a vapor bath at 230 to 240 degrees centigrade.

| No. | Phenol | Derived From | Physical Form |
|---|---|---|---|
| 11P | ⬡-OH, C₄H₆OC₂H₅ | 11E | Brownish oil. |
| 12P | ⬡-OH, C₄H₆OCH(CH₃)₂ | 12E | Do. |
| 13P | ⬡-OH, C₄H₆OCH₂CH₂CH₂CH₃ | 13E | Light yellowish oil. |
| 14P | ⬡-OH, C₄H₆OC₅H₁₁-pri | 14E | Do. |
| 15P | ⬡-OH, C₄H₆O-cyclo-C₆H₁₁ | 15E | Do. |
| 16P | ⬡-OH, C₄H₆—OCH₂CH₂OCH₃ | 16E | Do. |

All the above phenols showed substantially the correct neutralization equivalent when potentiometrically titrated with 0.1 N tetrabutylammonium hydroxide in pyridine solution. The infrared spectra of these products exhibited a band at 915 cm.$^{-1}$ indicating the $$-CH(CH=CH_2)CH_2OR$$

structure and at 975 cm.$^{-1}$ indicating the $$-CH(CH_3)CH=CHOR$$

structure, predominantly the former.

Each of the above phenols (1 part by weight) was allowed to stand for one day with 0.5 part by weight of methyl isocyanate plus a catalytic amount (1%) of dibutyltin dilaurate, then stripped to about 120 degrees centigrade under 0.1 millimeter pressure to remove excess isocyanate. The products remained as undistilled syrups.

| No. | Carbamate* | Derived From | Physical Form | Percent N Calcd. | Percent N Found |
|---|---|---|---|---|---|
| 11C | ⬡-OCONHCH₃, -C₄H₆OC₂H₅ | 11P | Light brown syrup | 5.6 | 5.1 |
| 12C | ⬡-OCONHCH₂, -C₄H₆OCH(CH₃)₂ | 12P | do | 5.3 | 5.7 |
| 13C | ⬡-OCONHCH₃, -C₄H₆OCH₂CH₂CH₂CH₃ | 13P | Straw-colored syrup | 5.1 | 5.0 |
| 14C | ⬡-OCONHCH₃, -C₄H₆OC₅H₁₁-pri | 14P | do | 4.8 | 4.8 |
| 15C | ⬡-OCONHCH₃, -C₄H₆O-cyclo-C₆H₁₁ | 15P | Reddish-brown syrup | 4.6 | 4.5 |
| 16C | ⬡-OCONHCH₃, -C₄H₆OCH₂CH₂OCH₃ | 16P | Light brown syrup | 5.0 | 5.1 |

*—C₄H₆—in these formulae refers to the mixture of isomeric side chains —CH(CH=CH₂)CH₂— and —CH(CH₃)CH=CH—, predominating in the former.

EXAMPLE 17

To a solution of 15 grams of sodium methoxide and 22 grams methyl mercaptan in 250 cubic centimeters methanol was added 18.3 grams of 1-chloro-4-phenoxy-2-butene, causing a vigorous exotherm. When the reaction subsided, the mixture was refluxed for one hour, then stripped under vacuum to remove alcohol. The product was taken up in benzene, washed with water, stripped free of benzene, and distilled to obtain 16 grams of 1-methylthio-4-phenoxy-2-butene as a nearly colorless oil, boiling point 104 to 105 degrees centigrade (0.15 mm.).

*Analysis.*—Calculated for $C_{11}H_{14}OS$: S, 16.5. Found: S, 16.2.

This sulfide was rearranged to the corresponding phenol by heating under nitrogen at 235 degrees centigrade then cooled to 25 degrees centigrade and treated with methyl isocyanate (50% molar excess) for one hour under reflux. The desired N-methylcarbamate was obtained as a brownish syrup having the correct sulfur and nitrogen analysis for $C_{13}H_{17}O_2NS$.

EXAMPLE 18

To a solution of 47 grams of phenol and 20 grams of sodium hydroxide in 200 cubic centimeters of ethanol was added 21 grams of a mixture of roughly equal amounts of

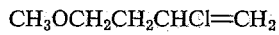

$CH_3OCH_2CH_2CH=CHCH_2Cl$ and $CH_3OCH_2CH_2CHCl=CH_2$ (obtained by the known addition of chloromethyl methyl ether to butadiene in the presence of zinc chloride). The solution was refluxed for 90 minutes, then evaporated to a pot temperature of 100 degrees centigrade, water then added to dissolve the salts, and the organic oil separated off. The oil was distilled at 100 to 120 degrees centigrade (1.5 mm.). Infrared examination showed it was principally $CH_3OCH_2CH_2CH=CHCH_2OC_6H_5$ with a very minor amount of $CH_3OCH_2CH_2CH_2(OC_6H_5)—CH=CH_2$ This ether was converted to the corresponding phenol by heating at 234 to 240 degrees centigrade for 1 hour. The product was a light amber oil, neutralization equivalent 205 (theory 192, therefore 94% pure). The phenol was found by infrared examination to have both the

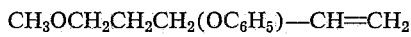

$—CH(CH=CH_2)CH_2CH_2OCH_3$ and

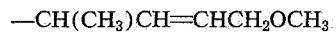

$—CH(CH_3)CH=CHCH_2OCH_3$ side chain isomers present, but predominantly the former. The phenol was converted to the corresponding N-methylcarbamate by warming at 40 degrees centigrade for 1 hour with ⅓ its volume of methyl isocyanate in the presence of 1 to 2 percent triethylene diamine catalyst. It was then freed of excess isocyanate by warming to 120 degrees centigrade at 0.1 millimeter, leaving the carbamate as a light tan syrup having the correct nitrogen analysis and showing the carbamate carbonyl and N-H bands in the infrared spectrum.

EXAMPLE 19

1,4-bis(p-cresoxy)-2-butene (I) was obtained by refluxing 11 grams sodium methoxide in 100 milliliters methanol with 21 grams p-cresol and then adding 13 grams trans-1,4-dichloro-2-butene; yield 90 percent of colorless crystalline solid, melting point 118 degrees centigrade.

A solution of 8 grams of this intermediate in 8 grams N,N-diethylaniline was refluxed for four hours, then stripped under 0.5 millimeter pressure to remove diethylaniline. The residue was washed with dilute hydrochloric acid several times, then recrystallized from ethanol to yield 7 grams of the corresponding cresoxybutenylcresol (IV), a colorless solid, melting point 105 degrees centigrade.

Treating a solution of 5 grams of this phenol in 10 milliliters benzene with methyl isocyanate as described in Example 2 yields the corresponding p-cresoxybutenylcresyl N-methylcarbamate, 5 grams of colorless solid, melting point 102.5 to 103 degrees centigrade (from heptane).

*Analysis.*—Calculated for $C_{20}H_{23}O_3N$: N, 4.31. Found: N, 4.46.

EXAMPLE 20

To a solution of 11 grams sodium methoxide in 100 milliters ethanol was added 21 grams p-cresol and then 25 grams trans-1,4-dichloro-2-butene. After refluxing for two hours, the reaction mixture is poured into ether. A distillation yields 15 grams trans-1-chloro-4-p-cresoxy-2-butene, a colorless liquid, boiling point 100 to 105 degrees centigrade (0.3 mm.), $n_D^{25}$ 1.5378. As by-product there is formed 5 grams of 1,4-bis(p-cresoxy)-2-butene identical with that described in the preceding example.

Trans-1-chloro-4-p-cresoxy-2-butene is converted into 1-methoxy-4-p-cresoxy-2-butene, by reacting with sodium methoxide similarly as described in Example 3, to obtain a colorless liquid, boiling point 95 to 100 degrees centigrade (0.05 mm.), $n_D^{25}$ 1.5166. Heating 20 grams of this ether up to 230 degrees centigrade for three hours yields on distillation 12 grams of the corresponding methoxybutenyl-p-cresol, a colorless liquid, boiling point 150 to 155 degrees centigrade (0.05 mm.), $n_D^{25}$ 1.5640.

Treatment of this cresol in benzene solution gives methoxybutenyl-p-cresyl N-methylcarbamate as an oil. Potentiometric titration indicated the phenolic group to be absent.

*Analysis.*—Calculated for $C_{14}H_{19}O_3N$: N, 5.62. Found: 5.60.

EXAMPLE 21

To a solution of 11 grams sodium methoxide in 100 milliliters methanol was added 26 grams trans-1,4-dichloro-2-butene, then the mixture was refluxed for 1 hour, poured into 500 milliliters water, and extracted with ether. The organic layer was dried over calcium chloride and then distilled to yield 16 grams 1-chloro-4-methoxy-2-butene, boiling point 70 to 72 degrees centigrade (13 mm.), $D_{25}^{25}$ 1.004, $n_D^{25}$ 1.4484.

*Analysis.*—Calculated for $C_5H_9OCl$: Cl, 29.46. Found: 29.5.

Refluxing 1-chloro-4-methoxy-2-butene with an equimolar amount of the sodium salts of the corresponding phenols in benzene/ethanol yields the following methoxybutenyl aryl ethers as summarized in the following table.

| No. | Structure | Yield (percent) | B.P. (° C)/mm. | $n_D^{25}$ |
|---|---|---|---|---|
| 1 | 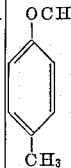 $OCH_2CH=CHCH_2OCH_3$ on ring with $CH_3$ substituent | 85 | 100°/0.05 | 1.5166 |

| No. | Structure | Yield (percent) | B.P. (° C.)/mm. | $n_{D}^{25}$ |
|---|---|---|---|---|
| 2 | OCH₂CH=CHCH₂OCH₃ on phenyl with —CH₃ | 73 | 160°/12–85°/0.05 | 1.5181 |
| 3 | OCH₂CH=CHCH₂OCH₃ on phenyl with —CH(CH₃)₂ | 78 | 120°/0.03 | 1.5109 |
| 4 | OCH₂CH=CHCH₂OCH₃ on phenyl with Cl (para) | 83 | 100–110°/0.05 | 1.5280 |
| 5 | OCH₂CH=CHCH₂OCH₃ on phenyl with Cl (meta) | 83 | 108–112°/0.1 | 1.5326 |
| 6 | OCH₂CH=CHCH₂OCH₃ on phenyl with (CH₃)₂CH— and —CH(CH₃)₂ | 70 | 140–150°/0.03 | 1.5070 |

EXAMPLE 22

The methoxybutenyl aryl ethers as described in the preceding example are heated up to 230 to 235 degrees centigrade for three hours, and then stripped free of ether under reduced pressure, leaving the rearranged phenol derivative behind. These phenols are converted into N-methylcarbamates by treatment with methyl isocyanate as described in Example 2.

TABLE

| No. | Structure* R=OCONHCH₃ | Physical Appearance | N-Analysis | |
|---|---|---|---|---|
| | | | Calculated | Found |
| 1 | Phenyl with R, CH(CH=CH₂)(CH₂OCH₃), and CH₃ | Oil | 5.62 | 5.60 |
| 2 | Phenyl with R, C(CH=CH₂)(CH₂OCH₃), and H₃C— | Oil | 5.62 | 5.59 |
| 3 | Phenyl with R, CH(CH=CH₂)(CH₂OCH₃), and (CH₃)₂CH— | Oil | 5.05 | 4.95 |
| 4 | Phenyl with R, CH(CH=CH₂)(CH₂OCH₃), and Cl | Wax | 5.20 | 5.19 |

TABLE—Continued

| No. | Structure* R=OCONHCH$_3$ | Physical Appearance | N-Analysis Calculated | N-Analysis Found |
|---|---|---|---|---|
| 5 | R, CH=CH$_2$, CH, CH$_2$OCH$_3$, Cl- (on benzene ring) | Oil | 5.20 | 5.17 |
| 6 | R, CH=CH$_2$, CH, CH$_2$OCH$_3$, (CH$_3$)$_2$CH-, CH(CH$_3$)$_2$ (on benzene ring) | Oil | 4.39 | 4.31 |

* Principal isomer, accompanied by minor amount of β-methoxymethallyl isomer.

EXAMPLE 23

Employing analogously p-chlorophenol instead of p-cresol as described in Example 19, 1,4-bis(p-chlorophenoxy)-2-butene is obtained. Yield 95 percent, melting point 123 degrees centigrade.

*Analysis.*—Calculated for $C_{16}H_{14}O_2Cl_2$: Cl, 22.8. Found: Cl, 22.4.

Heating of this diether up to 230 to 240 degrees centigrade for four hours, yields a phenol, which may be purified by dissolving in 2 N NaOH-solution and extracting the unreacted neutral portions with ether. Addition of dilute sulfuric acid to the aqueous layer gives 2-(p-chlorophenoxybutenyl)-p-chlorophenol, which may be isolated by ether extraction. Treating this phenol in trichloroethylene with methyl isocyanate gives the desired 2-(p-chlorophenoxybutenyl) - p-chlorophenyl-N-methylcarbamate.

*Analysis.*—Calculated for $C_{18}H_{17}O_3Cl_2N$: N, 3.85; Cl, 19.4. Found: N, 3.78; Cl, 19.2.

EXAMPLE 24

The insecticidal activity of various compounds of the invention was determined by spraying aqueous dispersions of the compounds at various concentrations on bean plants infested with aphids and with Mexican bean beetles. Results are presented in the following tables:

*Insecticidal activity*

MORTALITY OF BEAN APHIDS IN PERCENT ON CONTACT (AFTER 24 HOURS)

| Compound | 1,000 | 500 | 250 | 125 | 62 | 31 | 15 | 7 |
|---|---|---|---|---|---|---|---|---|
| OCONHCH$_3$, CH=CH$_2$, CH, CH$_2$OCH$_3$ and OCONHCH$_3$, CH—CH$_3$, CH=CHOCH$_3$ | 100 | 100 | 94 | 93 | 75 | 40 | | |
| OCONHCH$_3$, CH=CH$_2$, CH, CH$_2$SC$_2$H$_5$ and OCONHCH$_3$, CH—CH$_3$, CH=CHSC$_2$H$_5$ | 98 | 100 | 90 | 50 | 18 | | | |
| OCONHCH$_3$, CH=CH$_2$, CH, CH$_2$SCH$_3$ and OCONHCH$_3$, CH—CH$_3$, CH=CHSCH$_3$ | 100 | 100 | 100 | 78 | 67 | | | |
| OCONHCH$_3$, CH=CH$_2$, CH, CH$_2$CH$_2$OCH$_3$ and OCONHCH$_3$, CH—CH$_3$, CH=CH, CH$_2$OCH$_3$ | 100 | 100 | 45 | | | | | |

MORTALITY OF MEXICAN BEAN BEETLES IN PERCENT (IN 24 HOURS)

| Compound of Example No. | Concentration in p.p.m. | | | | | | | |
|---|---|---|---|---|---|---|---|---|
| | 1,000 | 500 | 250 | 125 | 62 | 31 | 15 | 7 |
| 2 | 100 | 100 | 100 | 50 | 0 | | | |
| 4 | 100 | 100 | 100 | 100 | 100 | 100 | 37.5 | 25 |
| 7 | 100 | 100 | 100 | 75 | 0 | | | |
| 10 | 100 | 0 | | | | | | |
| 11C | 100 | 100 | 100 | 100 | 50 | | | |
| 12C | 100 | 100 | 0 | | | | | |
| 13C | 100 | 100 | 0 | | | | | |
| 14C | 100 | 87.5 | 0 | | | | | |
| 15C | 100 | 100 | 100 | 50 | | | | |

Further tests were conducted on caged houseflies with the following results:

MORTALITY OF HOUSEFLIES (*Musca Domestica*)
(AFTER 2 AND 24 HOURS)

| Compound of Example No. | Hours | Percent Mortality at 0.1% Conc. |
|---|---|---|
| 4 | 2 | 100 |
| | 24 | 100 |
| 7 | 2 | 75 |
| | 24 | 85 |
| 18 | 2 | [1] 100 |
| | 24 | [1] 100 |

[1] Also 100 at 0.0125.

Further tests were conducted on mite-infested bean plants.

MORTALITY OF MITES (*Tetranychus telarius*)
(AFTER 24 HOURS)

Compound of                 Percent mortality
Example No.:                at 0.1% conc.
   4 _____ 75
   7 _____ 100
  10 _____ 75
  14C _____ 80

EXAMPLE 25.—FORMULATION AS EMULSIFIABLE CONCENTRATE

The following ingredients are blended:

Lbs.

2-(1 - [methoxymethyl]allyl)-4-(dimethylamino)-m-cresyl N-methylcarbamate _____ 2
Emcol H300X (polyoxyethylene ether-arylsulfonate emulsifier blend) _____ 0.2
Emcol H500X (polyoxyethylene ether-arylsulfonate emulsifier blend) _____ 0.2
Solvent (1:3 isophorane-xylene blend), to 1 gallon.

The resultant solution is emulsified with water and sprayed onto bean plants for control of aphids and other insects.

EXAMPLE 26.—FORMULATION AS WETTABLE POWDER

The following ingredients are mixed and ground in a hammer mill:

Parts by weight

2 - (1 - [2-methoxyethyl]allyl)-3,5-dimethylphenyl N-methylcarbamate _____ 50
Marasperse N (lignin sulfonate dispersing agent) ____ 4
Sorbit P (alkylaryl sulfonate wetting agent) _____ 2
Microcel E (synthetic calcium silicate carrier) _____ 44

The resultant powder is dispersed in water by gentle agitation and sprayed onto tomatoes for control of Drosophila.

EXAMPLE 27.—FORMULATION AS AEROSOL SPRAY

The following ingredients are mixed and packaged in aerosol cans:

Percent 2-(1-[2-methoxyethyl]allyl)phenyl N - methylcarbamate _____ 0.8
Piperonyl butoxide (synergist) _____ 0.8
Petroleum distillate (co-solvent) _____ 1.0
Propellant (Freon) _____ 97.4

The resultant aerosol preparation is sprayed around barns for fly control.

While there have been described various embodiments of the invention, the methods and elements described are not intended to be understood as limiting the scope of the invention, as it is realized that changes therewithin are possible, it being intended to cover the invention broadly in whatever form its principle may be utilized.

We claim:

1. A compound of the formula

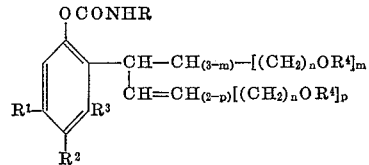

wherein the substituent R is lower alkyl, the substituents $R^1$, $R^2$, and $R^3$ are each selected from the group consisting of hydrogen, halogen, lower alkyl, lower alkoxy and di(lower alkyl) amino wherein when anyone of $R^1$, $R^2$ and $R^3$ is other than lower alkyl, at least one of said $R^1$, $R^2$ and $R^3$ is hydrogen, $R^4$ is a substituent selected from the group consisting of lower alkyl, allyl, cyclohexyl and benzyl, $m$ is an integer from 0 to 1 inclusive, $p$ is an integer from 0 to 1 inclusive, the sum of $m$ and $p$ always being equal to one and $n$ is an integer from 0 to 1 inclusive.

2. A compound of claim 1 wherein $R^1$, $R^2$ and $R^3$ are hydrogen, $R^4$ is lower alkyl and $n$ is 0.

3. A compound of claim 1 wherein $R^1$, $R^2$ and $R^3$ are hydrogen, $R^4$ is lower alkyl and $n$ is 1.

4.

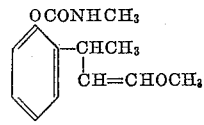

5.

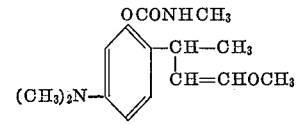

6.

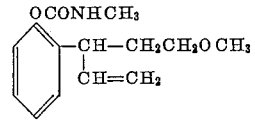

7.

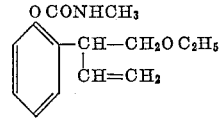

8.

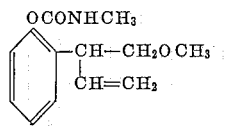

References Cited

UNITED STATES PATENTS

| | | |
|---|---|---|
| 2,209,245 | 7/1940 | Bartholomaus. |
| 2,362,508 | 11/1944 | Stevens et al. _____ 260—479 |
| 2,485,550 | 10/1949 | Aeschlimann et al. |
| 2,776,197 | 1/1957 | Gysin et al. |
| 2,992,967 | 7/1961 | Haubein _____ 167—30 |
| 3,012,933 | 12/1961 | Phillips _____ 167—30 |
| 3,062,868 | 11/1962 | Moore et al. _____ 260—479 |
| 3,066,163 | 11/1962 | Ospenson et al. _____ 260—479 |

FOREIGN PATENTS

| | | |
|---|---|---|
| 1,275,658 | 10/1961 | France. |
| 912,895 | 12/1962 | Great Britain. |

OTHER REFERENCES

Kolbezen et al., Journal of Agricultural and Food Chemistry, vol. 2, pp. 864–870 (1954).

Metcalf, Pest Control, vol. 30, pp. 20, 26 and 28 (1962).

RICHARD K. JACKSON, *Primary Examiner.*

JULIAN S. LEVITT, DANIEL HORWITZ, LORRAINE A. WEINBERGER, *Examiners.*

G. A. MENTIS, I. R. PELLMAN, *Assistant Examiners.*

UNITED STATES PATENT OFFICE
CERTIFICATE OF CORRECTION

Patent No. 3,349,116                      October 24, 1967

Edward D. Weil et al.

It is hereby certified that error appears in the above numbered patent requiring correction and that the said Letters Patent should read as corrected below.

Column 11, line 27, for "$CH_3OCH_2CH_2CHCl=CH_2$" read -- $CH_3OCH_2CH_2CHCl-CH=CH_2$ --; column 12, line 58, for "1-chloro-4-methoxy-2-butene" read -- 1-chloro-4-methoxy-2-butene --; columns 13 and 14, in the first table, last column heading, for $nS_{25}$              read          $n_D^{25}$ same columns, last table, opposite No. 2, the formula should appear as shown below instead of as in the patent:

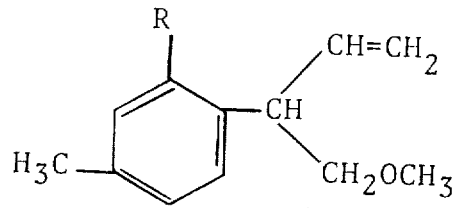

columns 15 and 16, first table, in the footnote, for "β" read -- γ --; column 17, in the second table, second column, line 3 thereof, for "2", in the tens column, read -- 2 --, in the units column.

Signed and sealed this 15th day of April 1969.

(SEAL)
Attest:

EDWARD M. FLETCHER, JR.
Attesting Officer

EDWARD J. BRENNER
                                         Commissioner of Patents